United States Patent
Okamoto et al.

(10) Patent No.: US 7,980,084 B2
(45) Date of Patent: Jul. 19, 2011

(54) TEMPERATURE CONTROL APPARATUS, METHOD AND PROGRAM FOR PELTIER ELEMENT

(75) Inventors: Koji Okamoto, Kanagawa (JP); Masanobu Kimura, Kanagawa (JP)

(73) Assignee: Sony Corporation (JP)

(*) Notice: Subject to any disclaimer, the term of this patent is extended or adjusted under 35 U.S.C. 154(b) by 913 days.

(21) Appl. No.: 11/975,066

(22) Filed: Oct. 17, 2007

(65) Prior Publication Data

US 2008/0092554 A1    Apr. 24, 2008

(30) Foreign Application Priority Data

Oct. 20, 2006   (JP) ................. P2006-285831

(51) Int. Cl.
*F25B 21/02*   (2006.01)
(52) U.S. Cl. ............................. 62/3.7; 62/314
(58) Field of Classification Search ........... 62/3.2, 62/3.3, 3.7; 136/203; 361/162; 700/299
See application file for complete search history.

(56) References Cited

U.S. PATENT DOCUMENTS

| | | | |
|---|---|---|---|
| 5,864,386 A | 1/1999 | Nei | |
| 5,989,400 A * | 11/1999 | Islam | 204/466 |
| 6,260,360 B1 | 7/2001 | Wheeler | |
| 7,750,287 B2 | 7/2010 | Okamoto | |
| 2003/0051485 A1 * | 3/2003 | Hoschek | 62/3.2 |
| 2004/0113060 A1 | 6/2004 | Nabeyama et al. | |
| 2005/0078451 A1 * | 4/2005 | Sauciuc et al. | 361/700 |

FOREIGN PATENT DOCUMENTS

| | | |
|---|---|---|
| JP | 62-280915 A | 12/1987 |
| JP | 7-325281 A | 12/1995 |
| JP | 8-014723 A | 1/1996 |
| JP | 10-050588 A | 2/1998 |
| JP | 10-318624 A | 12/1998 |
| JP | 11-173727 A | 7/1999 |
| JP | 2000-274788 A | 10/2000 |
| JP | 2003-299435 A | 10/2003 |
| JP | 2005-026473 A | 1/2005 |
| JP | 2005-250249 A | 9/2005 |
| JP | 2005-331230 A | 12/2005 |
| JP | 2006-005212 A | 1/2006 |
| JP | 2006-055032 A | 3/2006 |
| JP | 2006-183882 A | 7/2006 |

* cited by examiner

*Primary Examiner* — Mohammad Ali
(74) *Attorney, Agent, or Firm* — Lerner, David, Littenberg, Krumholz & Mentlik, LLP

(57) ABSTRACT

A temperature control apparatus is provided which controls temperature of a control target disposed on the side of an A-side of a Peltier device. The apparatus includes a temperature regulator which performs regulating operation on temperature of a B-side of the Peltier device opposite to the A-side on the basis of a drive voltage for the Peltier device.

6 Claims, 5 Drawing Sheets

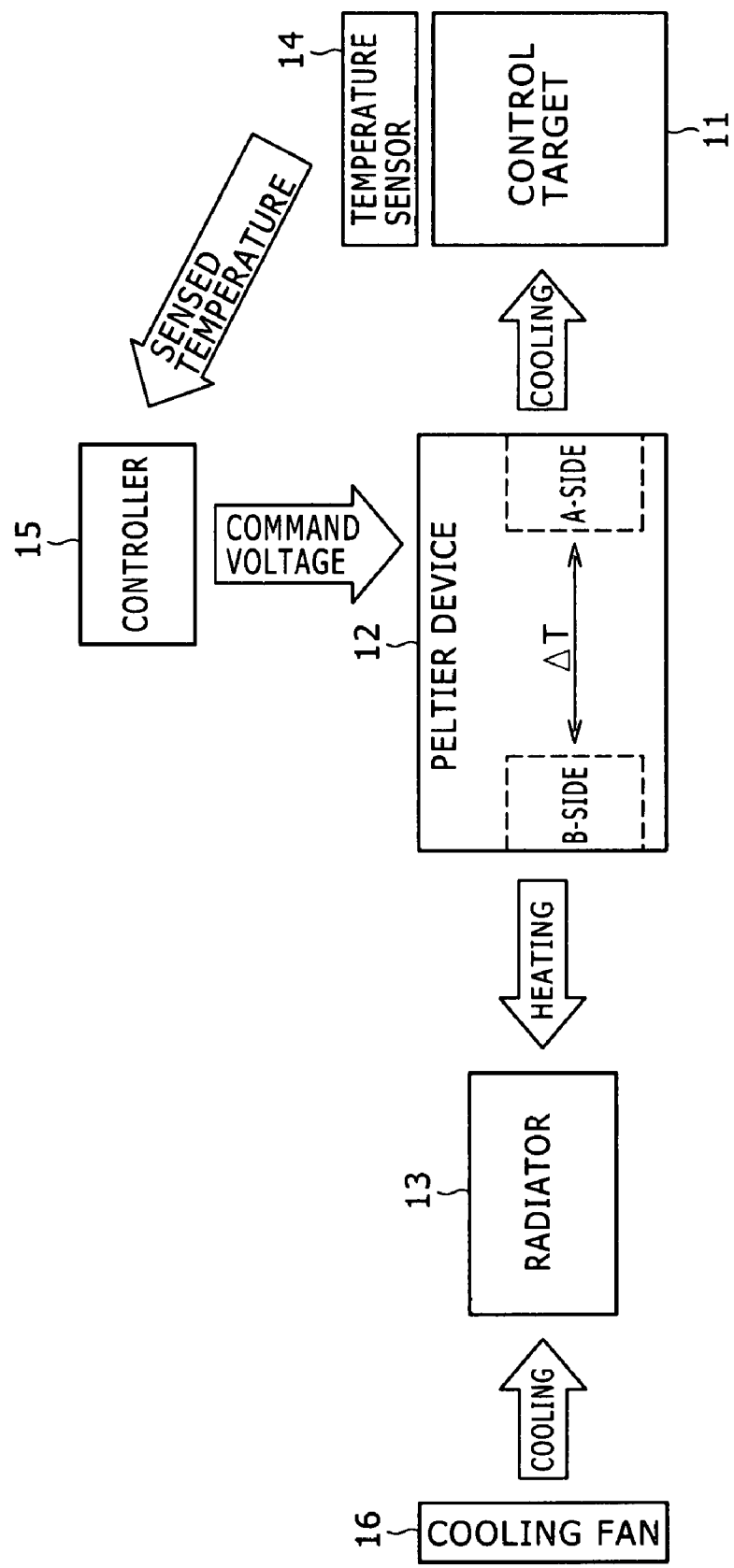
F I G . 1

ID# TEMPERATURE CONTROL APPARATUS, METHOD AND PROGRAM FOR PELTIER ELEMENT

CROSS-REFERENCE TO RELATED APPLICATIONS

The present application claims priority from Japanese Patent Application No. JP 2006-285831, filed in the Japanese Patent Office on Oct. 20, 2006, the entire content of which is incorporated herein by reference.

BACKGROUND OF THE INVENTION

1. Field of the Invention

The present invention relates generally to a temperature control apparatus and method, and a program. In particular, the invention relates to a temperature control apparatus and method that use a Peltier device to efficiently control the temperature of a control target that needs both cooling and heating applications and to a program therefor.

2. Description of the Related Art

In recent years the Peltier device has been used to control the temperature of a control target as cooling application (see e.g. Japanese Patent Laid-open No. 2005-250249).

For example, FIG. 1 illustrates the configuration of an existing temperature control system (hereinafter, referred to as the existing system) using a Peltier device by way of example.

The existing system of FIG. 1 is configured to include a control target 11 through a cooling fan 16.

The existing system of FIG. 1 is provided with a Peltier system 12 in order to cool the control target 11.

The Peltier device 12 is a device having the Peltier effect. The Peltier effect is a phenomenon in which when electric current flows through the junction between dissimilar conductors, e.g., p-type and n-type conductors, heat absorption occurs at the junction. The Peltier device is configured such that a plurality of p-type and n-type semiconductors are alternately joined on the respective opposed sides of a pair of substrates through a conductor. When the Peltier device is energized, one of the substrate sides becomes a heat-absorbing side and the other becomes a heat-generating side.

In the example of FIG. 1, the A-side of the Peltier device 12 is used as a heat-absorbing side and the B-side is used as a heat-generating side. In addition, a control target is disposed close to the A-side. When a predetermined positive voltage value is applied to the Peltier device 12, a temperature difference ΔT corresponding to the positive voltage value occurs between the A-side and the B-side. Here, since the A-side becomes the heat-absorbing side, the temperature difference ΔT occurs in which the B-side has high temperatures and the A-side has low temperatures. Thus, the heat radiated by the control target 11 is absorbed by the A-side, with the result that the control target can be cooled.

For example, a controller 15 composed of e.g. dedicated hardware, a computer, etc. determines a predetermined positive voltage value as a command voltage to the Peltier device 12 on the basis of the temperature sensed by a temperature sensor 14 which measures the temperature of the control target 11. The controller 15 changes the temperature difference ΔT of the Peltier device 12 by applying the command voltage to the Peltier device 12, consequently exercising the temperature control so as to cool the control target 11. Incidentally, the command voltage mentioned above refers to a drive voltage for the Peltier device 12.

In this temperature control, as the sensed temperature of the control target 11 is higher than the control target value, that is, as an error (temperature difference) between the sensed temperature and the control target value is increased, the command voltage, namely, the positive voltage value from the controller 15 is increased. Thus, the temperature difference ΔT of the Peltier device 12 is increased accordingly.

In the Peltier device 12 in this case, if the temperature of the B-side is constant, the temperature of the A-side drops according to the increase of the temperature difference ΔT, which enhances the cooling effect of the control target 11. Then, the sensed temperature of the control target 11 gradually drops to come close to the control target value. In other words, the error (temperature difference) between the sensed temperature and the control target value gradually decreases. In addition, the command voltage, i.e., the positive voltage value from the controller 15 gradually decreases. Also the temperature difference ΔT of the Peltier device 12 gradually decreases accordingly. Finally, the sensed temperature of the control target 11 coincides with the control target value, that is, the error (temperature difference) between the sensed temperature and the control target value is eliminated. Thus, the command voltage from the controller 15 becomes zero and also the temperature difference ΔT of the Peltier device 12 is eliminated.

However, in the Peltier device 12 in FIG. 1, the B-side functions as a heat-generating side to causes a heating phenomenon, which is a phenomenon reverse to the cooling phenomenon of the A-side. The temperature of the B-side rises unless some kinds of measures are applied to the B-side. In this case, if the command voltage from the controller 15 is constant, that is, if the temperature difference ΔT of the Peltier device 12 is constant, the temperature of the A-side rises as a result of the increased temperature of the B-side, which reduces the cooling effect of the control target 11. According to circumstances, also the sensed temperature of the control target 11 rises to a level higher than the control target value. In other words, the error (temperature difference) between the sensed temperature and the control target value increases. Also the command voltage from the controller 15, i.e., the positive voltage value rises accordingly. That is to say, unless the increased temperature of the B-side is suppressed, the temperature difference ΔT of the Peltier device is further increased. Finally, at the stage where the temperature difference ΔT excesses a permissible value, the Peltier device 12 goes out of control (becomes uncontrollable).

Accordingly, it is necessary to suppress the increased temperature of the B-side in order to enhance the cooling effect on the control target 11 and to prevent the Peltier device 12 from going out of control. To meet the necessity, the existing system of FIG. 1 includes a radiator 13 to radiate heat from the B-side and the cooling fan 16 to cool the radiator 13. Incidentally, Japanese Patent Laid-Open No. 2005-250249 employs a heat sink as the radiator 13.

SUMMARY OF THE INVENTION

However, the temperature control is not substantially exercised on the B-side of the Peltier element 12 in the existing system of FIG. 1. Therefore, it may not be said that the increased temperature of the B-side is appropriately suppressed. That is to say, it is not sufficient that the radiator 13 and cooling fan 16 are merely provided to enhance the cooling effect on the control target 11 and to prevent the Peltier device from going out of control.

In recent years research and development of temperature control have been performed which uses the Peltier device 12 for heating application as well as for cooling application. It is preferable that e.g. a reflective liquid crystal panel or the like mounted on a digital cinema projector be used in low temperature conditions as much as possible in view of operating life. However, in view of performance, it is necessary to keep the temperature at a given level or more. To balance the operating life with the performance, it is necessary to exercise the temperature control within a given temperature range. In the case where the Peltier device 12 is used for the temperature control on such reflective liquid crystal panel or the like, if the control temperature lowers below the temperature ranges, the Peltier device 12 must be used for heating application.

For the example of FIG. 1, if the reflective liquid crystal panel or the like is employed as the control target 11, it may be necessary to cool the control target 11. In such a case, the A-side of the Peltier device 12 is functioned as the heat-absorbing side in an existing manner. In addition, it is necessary for the A-side of the Peltier device 12 to function as the heat-generating side when it is necessary to heat the control target 1. It is possible to allow the A-side of the Peltier device 12 to function as the heat-generating side by the controller 15 applying a negative voltage value as a command voltage to the Peltier device 12.

However, since the B-side functions as the heat-absorbing surface in this case, the cooling phenomenon reverse to the heating phenomenon of the A-side occurs on the B-side. For example, when an ambient temperature is low, the B-side will drop in temperature. If the command voltage from the controller 15 is constant, that is, if the temperature difference ΔT of the Peltier device 12 is constant, also the A-side drops in temperature resulting from the decreased temperature of the B-side. According to circumstances, also the sensed temperature of the control target 11 drops to a level below the control target value. That is to say, also the error (temperature difference) between the sensed temperature and the control target value increases. The command voltage from the controller, namely, the negative voltage value increases accordingly. In other words, unless the decreased temperature of the B-side is suppressed, the temperature difference ΔT of the Peltier device 12 is more and more increased. Finally, at the stage where the temperature difference ΔT excesses the permissible value, the Peltier device 12 goes out of control (becomes uncontrollable).

Accordingly, it is necessary to suppress the reduced temperature of the B-side in order to enhance the heating effect on the control target and to prevent the Peltier device 12 from going out of control.

The radiator 13 and the cooling fan 16 in the existing system of FIG. 1 have only the function of cooling the B-side of the Peltier device 12. If they operate, the reduced temperature of the B-side is not suppressed; on the contrary, the degree of the reduced temperature is more and more increased. In short, in the existing system of FIG. 1, it is inappropriate to use the Peltier device 12 for the heating application.

The above description is summarized as below. It has been desired in recent years to realize the technology using the Peltier device for temperature control on a control target which needs both cooling and heating applications. However, such a desire has not sufficiently been satisfied.

There is desirable to use a Peltier device to efficiently control the temperature of a control target that needs both cooling and heating applications.

According to an embodiment of the present invention, there is provided a temperature control apparatus which controls temperature of a control target disposed on the side of an A-side of a Peltier device, the apparatus including a temperature regulator which performs regulating operation on temperature of a B-side of the Peltier device opposite to the A-side on the basis of a drive voltage for the Peltier device.

The temperature regulator, if the drive voltage is a positive voltage, performs temperature-lowering operation for lowering the temperature of the B-side of the Peltier device as the regulating operation; if the drive voltage is a negative voltage, performs temperature-raising operation for raising the temperature of the B-side of the Peltier device as the regulating operation, and if it can be judged that the drive voltage is zero, stops the regulating operation.

The temperature regulator further varies the degree of the temperature-lowering operation or the temperature-raising operation according to a voltage value of the drive voltage.

The temperature control apparatus further includes a radiator disposed on the side of the B-side of the Peltier device and the temperature regulator performs operation for regulating the temperature of the radiator as the regulating operation.

The temperature control apparatus further includes a temperature sensor for sensing the temperature of the control target and a controller which determines a positive or negative voltage value as the drive voltage on the basis of the sensed temperature of the temperature sensor and applies the positive or negative voltage value to the Peltier device. The temperature regulator performs the regulating operation on the basis of the drive voltage applied to the Peltier device from the controller.

According to another embodiment of the present invention, there is provided a temperature control method for a temperature control apparatus which controls a control target disposed on the side of the A-side of a Peltier device, the method including the step of performing regulating operation for regulating temperature of a B-side of the Peltier device opposite to the A-side on the basis of a drive voltage for the Peltier device.

According to another embodiment of the present invention, there is provided a program performed by a computer controlling a temperature regulator which performs regulating operation for regulating temperature of a B-side of a Peltier device opposite to an A-side thereof, the computer being included in a temperature control apparatus which controls temperature of a control target disposed on the side of the A-side. The program includes the step of controlling regulating operation of the temperature regulator on the basis of a drive voltage for the Peltier device.

In the temperature control apparatus and method, and a program according to the embodiments of the present invention, when the temperature control is performed on the control target disposed on the side of the A-side of the Peltier device, the temperature of the B-side of the Peltier device opposite to the A-side thereof on the basis of the drive voltage for the Peltier device.

As described above, the present invention realizes the temperature control using the Peltier device. In particular, the temperature of the control target that needs both cooling and heating applications can efficiently be controlled by use of the Peltier device.

BRIEF DESCRIPTION OF THE DRAWINGS

FIG. 1 is a block diagram illustrating the configuration of an existing temperature control system by way of example;

DETAILED DESCRIPTION OF THE PREFERRED EMBODIMENTS

Embodiments of the present invention will be described below. The correspondence relationship between constituent elements described in claims and specific examples described in the specification and drawings is as below. This description is for confirming that specific examples supporting the invention described in the claims are described in the specification and drawings. There may be a specific example which is described in the specification and drawings but not described as one corresponding to a constituent element. However, this does not means such a specific example does not correspond to the constituent element. In contrast, there may be a specific element which is described herein as one corresponding to a constituent element. However, this does not mean such a specific example does not correspond to a constituent element other than the constituent element as above.

Further, this description does not mean that the invention corresponding to a specific example described in the specification and drawings is described in all claims. In other words, this description does not deny the presence of the invention that corresponds to a specific example described in the specification and drawings but is not described in the claims of this application, namely, the presence of the invention that will be filed as a divisional application or added by amendment in the future.

Figure 3:
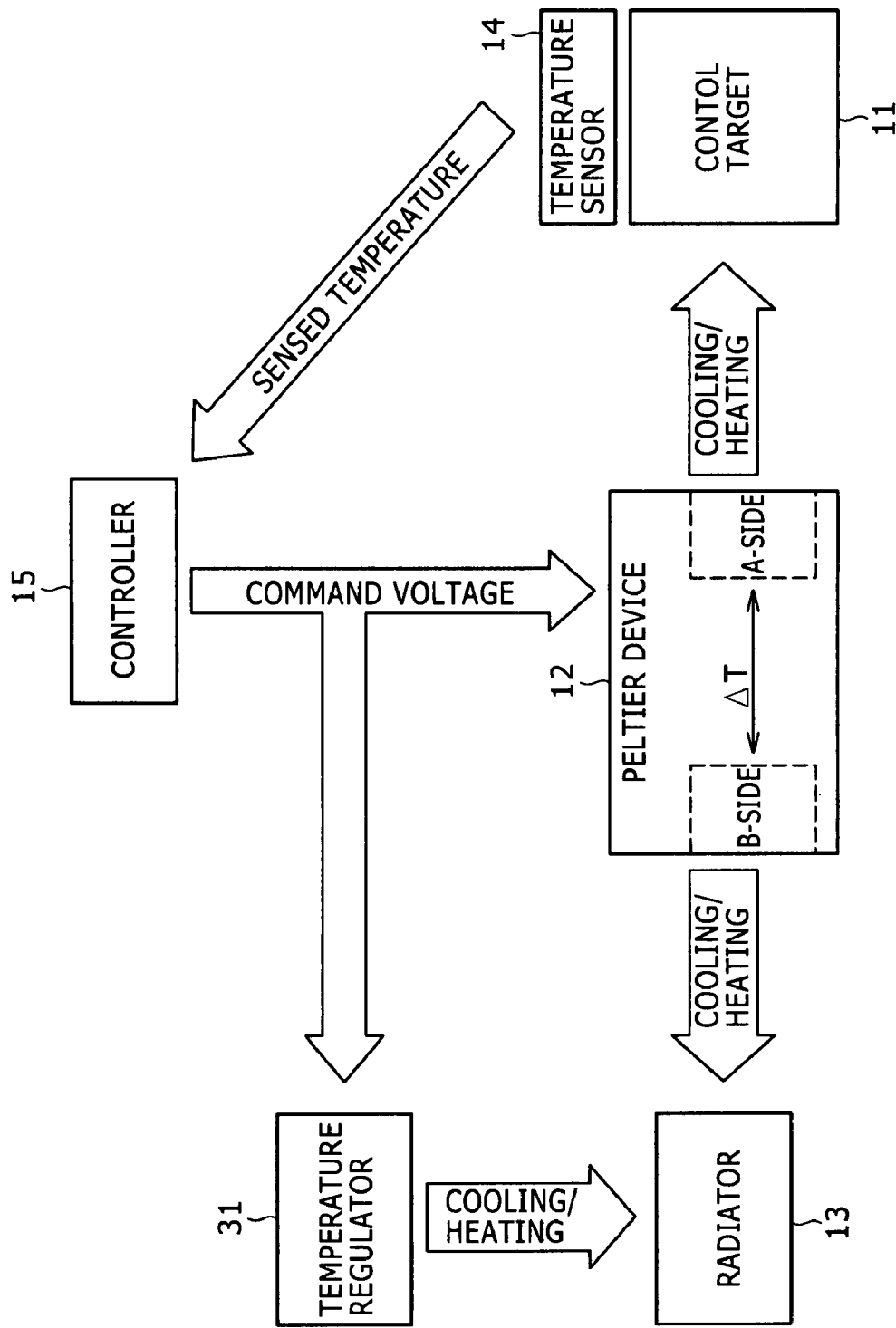
FIG. 3 is a block diagram illustrating the configuration of a temperature control system according to another embodiment of the invention.

A temperature control apparatus (e.g. the temperature control apparatus (system) of FIG. 3) according to an aspect of the present invention controls the temperature of a control target (e.g. the control target 11 of FIG. 3) disposed on the side of an A-side of a Peltier device (e.g. the Peltier device of FIG. 3). This apparatus includes a temperature regulator (e.g. the temperature regulator 31 of FIG. 3) which performs regulating operation on temperature of a B-side of the Peltier device opposite to the A-side on the basis of a drive voltage (e.g. a command voltage outputted from the controller 15 of FIG. 13) for the Peltier device.

Figure 4:
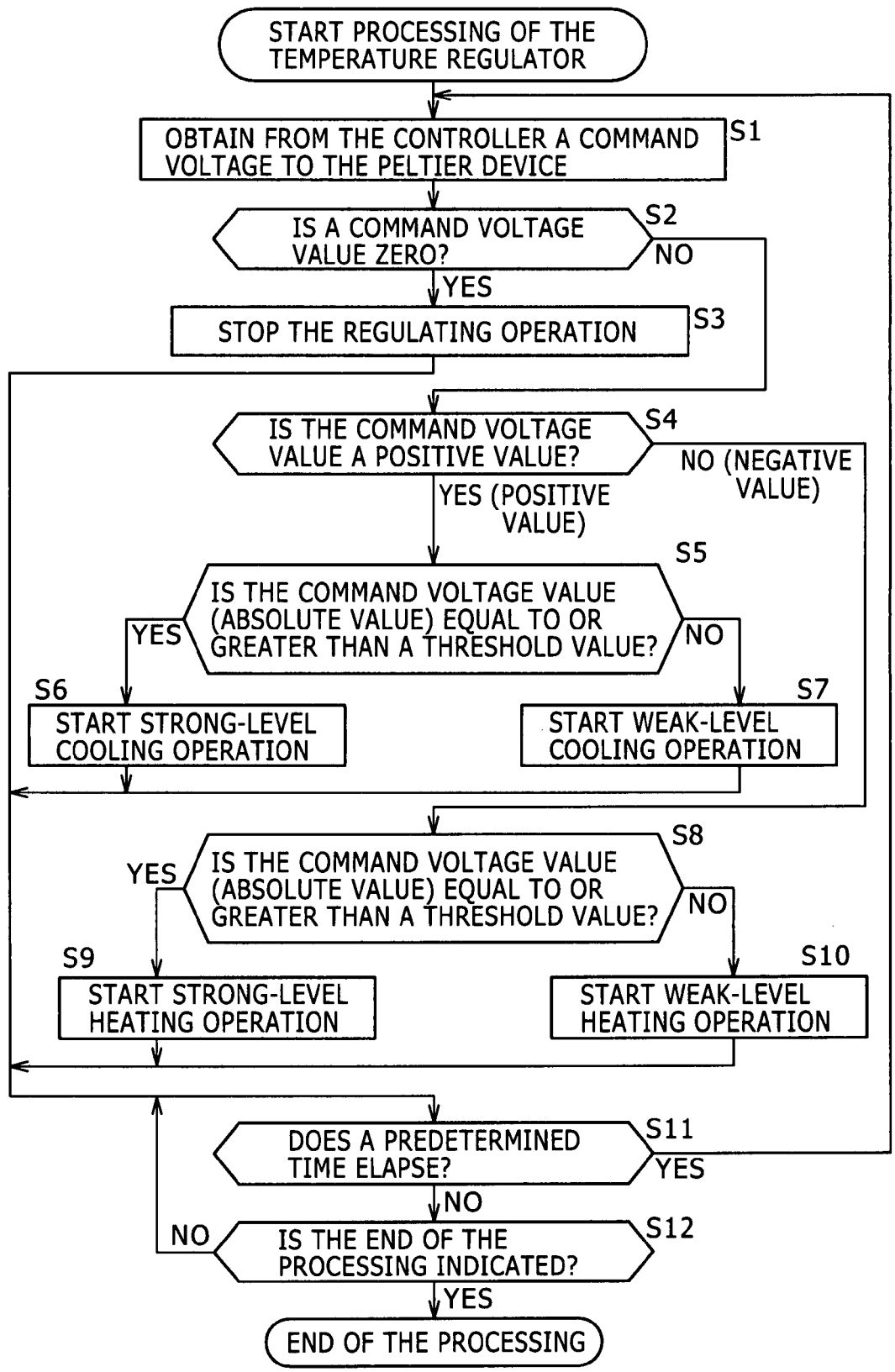
FIG. 4 is a flowchart for explaining processing of a temperature regulator in a B-side temperature control system of the temperature control system of FIG. 3 by way of example.

The temperature regulator:

if the drive voltage is a positive voltage, performs temperature-lowering operation (e.g. the cooling operation mentioned in steps S6 and S7 of FIG. 4) for lowering the temperature of the B-side of the Peltier device, as the regulating operation;

if the drive voltage is a negative voltage, performs temperature-raising operation (e.g. the heating operation mentioned in steps S9 and S10 of FIG. 4) for raising the temperature of the B-side of the Peltier device; and if it can be judged that the drive voltage is zero, stops the regulating operation (performs the processing of step S3 of FIG. 4, for instance).

The temperature regulator further varies the degree of the temperature-lowering operation or the temperature-raising operation according to a voltage value of the drive voltage (the operation of steps S5 to S7 of FIG. 4 or of steps S8 to S10 is performed, for instance).

The temperature control apparatus further includes a radiator (e.g. the radiator 13 of FIG. 3) disposed on the side of the B-side of the Peltier device and the temperature regulator performs operation for regulating the temperature of the radiator as the regulating operation.

The temperature control apparatus includes a temperature sensor (e.g. the temperature sensor 14 of FIG. 3) for sensing the temperature of the control target; and a controller (e.g. the controller 15 of FIG. 3) which determines a positive or negative voltage value as the drive voltage on the basis of the sensed temperature of the temperature sensor and applies the positive or negative voltage value to the Peltier device. The temperature regulator performs the regulating operation on the basis of the drive voltage (e.g. the command voltage mentioned in FIG. 3) applied to the Peltier device from the controller.

A temperature control method according to another aspect of the present invention is a temperature control method for a temperature control apparatus (e.g. the temperature control apparatus (system) of FIG. 3) which controls a control target (e.g. the control target 11 of FIG. 3) disposed on the side of the A-side of a Peltier device (e.g. the Peltier device 12 of FIG. 3), and the method includes the step of performing regulating operation for regulating temperature of a B-side of the Peltier device opposite to the A-side on the basis of a drive voltage for the Peltier device (e.g. performing the processing according to the flowchart of FIG. 4).

A program according to another embodiment of the present invention is a program that corresponds to the temperature control method according to another embodiment of the present invention described above and is performed by the computer of FIG. 5 for example.

Embodiments of the present invention will hereinafter be described with reference to the drawings.

To bring the embodiments with the above description of the paragraphs, "Background of the Invention" and "Summary of the Invention," also the following embodiments use words "heating" and "cooling. However, in the following, "heating" is a comprehensive concept containing positively applying heat to an object as well as increasing the temperature of the object to an ambient temperature without application of heat in the case where the temperature of the object is lower than the ambient temperature, for example. In other words, the "heating" used in the following simply implicates provision of a factor increasing the temperature of the object. Similarly, "cooling" used in the following is an antonym of the "heating" and implicates provision of a factor lowering the temperature of the object.

Figure 2:
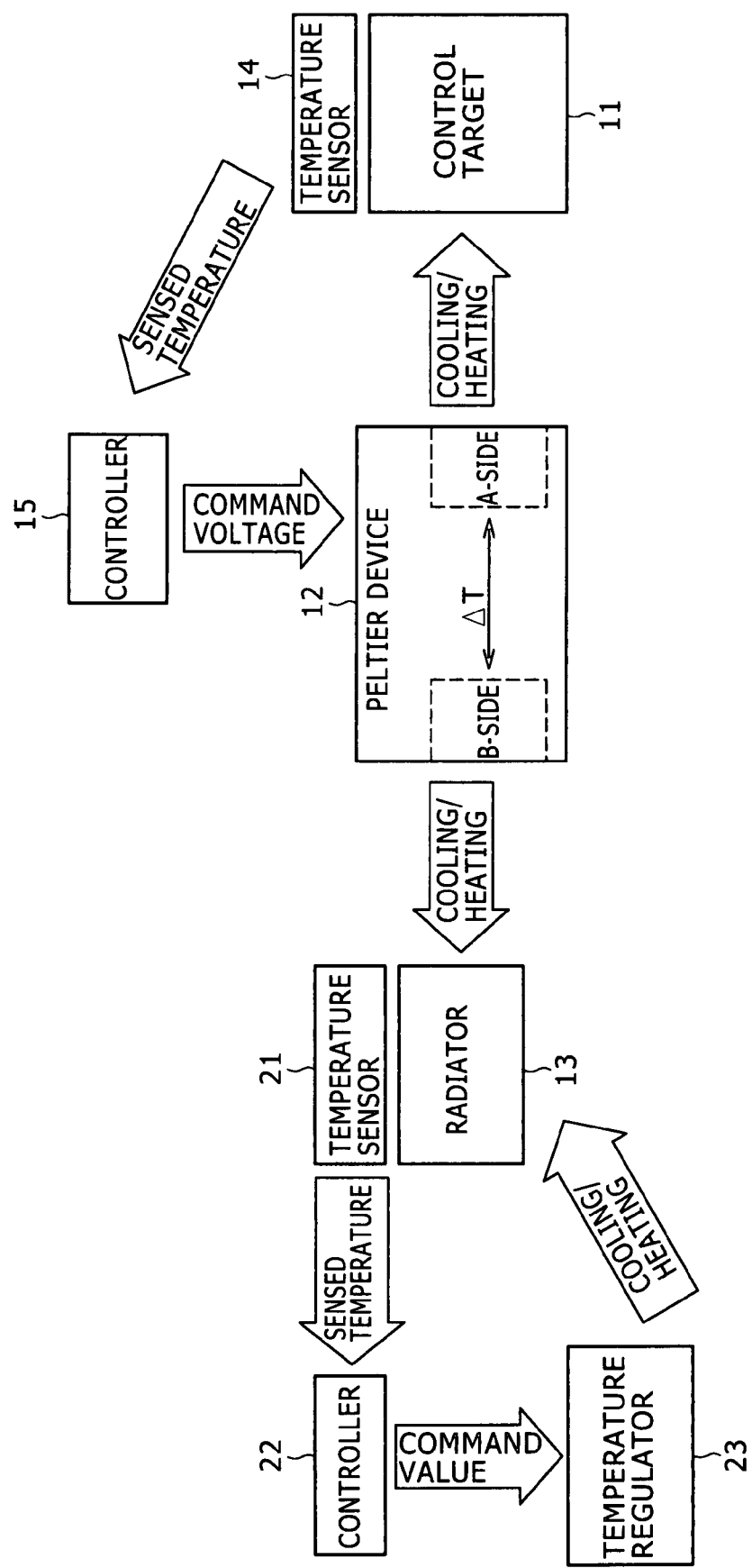
FIG. 2 is a block diagram illustrating the configuration of a temperature control system according to an embodiment of the present invention.

FIG. 2 illustrates a configuration of a temperature control system according to an embodiment of the present invention.

This system here refers to the entire apparatus composed of a plurality of processing devices and processing sections. In other words, the temperature control system of FIG. 2 can be grasped as one temperature control apparatus. This applies to another temperature control apparatus such as another embodiment of FIG. 3 described later or other embodiments.

Portions corresponding to those in the existing system of FIG. 1 are denoted with like reference numerals in the temperature control system of FIG. 2. Such portions are already described in the paragraph "Background of the Invention" and the like; therefore, the explanations are appropriately omitted.

The temperature control system of FIG. 2 uses a Peltier device 12 to exercise temperature control on a control target 11. This control target 11 differs from that in the existing system of FIG. 1 and needs both cooling and heating applications. For example, the temperature control system can employ a control target composed of the reflective liquid crystal panel or the like mentioned above.

Specifically, it is necessary to exercise temperature control on the B-side of the Peltier device 12 in order to enhance both heating and cooling effects on the control target 11 and to prevent the Peltier device 12 from going out of control. To meet the necessity, the temperature control system of FIG. 2 further includes a temperature sensor 21, a controller 22 and a temperature regulator 23 for a radiator 13 composed of a heat sink or the like in order to exercise the temperature control on the B-side.

In other words, the temperature control system of FIG. 2 includes a first control system (hereinafter referred to as the A-side temperature control system) similarly to the existing system of FIG. 1 and a second control system (hereinafter referred to as the B-side temperature control system), which is not included in the existing system of FIG. 1. The A-side control system uses the temperature sensor 14 and the controller 15 to exercise temperature control on the control target 11 close to the A-side on the basis of the temperature difference $\Delta T$ of the Peltier device 12. The B-side temperature control system uses a temperature sensor 21, a controller 22, a temperature regulator 23 and the radiator 13 to exercise temperature control on the B-side of the Peltier device 12.

The operation of the A-side temperature control system is the same as that of the existing system and is already explained in the paragraph "the background of the Invention" and the like. Therefore, the explanation is omitted. Incidentally, it may be necessary to explain the operation of the A-side temperature control system in the following description. In such a case, it is referred to as cooling operation that a positive voltage value as a command voltage is applied to the Peltier device 12 to allow its A-side to operatively function as a heat-absorbing side in order to cool (lower the temperature of) the control target 11. On the other hand, it is referred to as heating operation that a negative voltage value as a command voltage is applied to the Peltier device 12 to allow the A-side to operatively function as a heat-generating surface in order to heat (raise the temperature of) the control target 11.

A description is next made of the operation of the B-side temperature control system in the temperature control system of FIG. 2.

In the B-side temperature control system, the radiator 13 is directly temperature-controlled by the temperature regulator 23, with the result that the B-side of the Peltier device 12 is temperature-controlled.

Specifically, the controller 22 obtains as a feedback value a temperature sensed by the temperature sensor 21 which measures the temperature of the radiator 13. The controller 22 determines a command value to be given to the temperature regulator 23 according to a predetermined control principle using the sensed temperature. Incidentally, how to give a command value is not particularly restrictive. It is only needed for designers to appropriately select and adopt a technique appropriate for the configuration of the temperature regulator 23. For example, a technique may be adopted for giving the temperature regulator 23 a positive or negative voltage value as a command value similarly to the command voltage from the controller 15. Alternatively, a technique may be adopted for giving the temperature regulator 23 a digital value as a command value. In other words, the controller 22 can be composed of e.g., dedicated hardware equipment, a computer or the like and it is only needed to adopt a technique suitable for the configuration.

The temperature regulator 23 executes the operation of raising the temperature of the radiator 13 (hereinafter, referred to as the heating operation) or of lowering the temperature of the radiator 13 (hereinafter, referred to as the cooling operation).

The temperature regulator 23 suffices if it has a function of exercising the temperature regulation on the radiator 13, specifically, a function of exercising the heating operation as well as the cooling operation. The configuration thereof is not particularly restrictive.

For example, if it is not necessary to positively heat the radiator 13 as the heating operation, the temperature controller 23 can be composed of the existing cooling fan 16 (FIG. 1). Specifically, if the controller 22 judges that it is necessary to heat (raise the temperature of) the radiator 13, the controller 22 is needed only to give zero as the command value to the cooling fan 16 for stoppage. On the other hand, if it is judged to need to cool (lower the temperature of) the radiator 13, it is only needed to give as a command value a value indicating the operation mode of the cooling fan 16 (e.g. a value indicating a high-speed rotation mode, a value indicating a low-speed rotation mode, or the like) to the cooling fan 16 for rotation.

If it is necessary to positively apply heat to the radiator 13 as the heating operation, the temperature regulator 23 is needed only to be configured to include, e.g., in addition to the existing cooling fan 16, a device adapted to apply heated air to the cooling fan 16 (hereinafter, referred to as the heated air blower). That is to say, it may be judged that any of heating (raising the heat of) and cooling (lowering the temperature) of the radiator 13 is unnecessary. Except such a case, the cooling fan 16 itself is needed only to continue rotation by giving thereto a value indicating the operation mode of the cooling fan 16 (e.g., a value indicating a high-speed rotation mode or a low-speed mode or the like) as a command value. On the other hand, judging that it is necessary to heat (raising the temperature of) the radiator 13, the controller 22 actuates the heated air blower to supply heated air to the cooling fan 16. Judging that it is necessary to cool (lower the temperature of) the radiator 13, it is only needed for the controller 22 to stop the operation of the heated air blower.

Although repeated, the configuration of the temperature regulator 23 and the methods for the heating and cooling operation are not particularly limited to the embodiments described above.

A description is next made of the operation of the B-side temperature control system in the temperature control system of FIG. 2 using a specific example.

It is assumed that the sensed temperature of the temperature sensor 21 is 45° C.

The cause of bringing the sensed temperature of the temperature sensor 21 into 45° C. may be that the A-side temperature control system executes the heating operation, that is, the A-side of the Peltier device 12 functions as the heat-generating side to heat the control target 11. In this case, to increase the efficiency of the subsequent operation of the A-side control system, it is necessary to reduce the temperature difference $\Delta T$ of the Peltier device 12 more quickly. In such a case, the B-side temperature control system should perform the heating operation under normal circumferences so as to make the operation of the A-side temperature control system efficient, that is, to assist in reducing the temperature difference $\Delta T$ of the Peltier device 12 more quickly.

However, the temperature control system of FIG. 2 is such that the A-side temperature control system and the B-side temperature control system are independent of each other. Therefore, the controller 22 of the B-side temperature control system may not get the operating state of the Peltier device 12.

If the controller 22 includes the low that "if the temperature sensor 21 indicates 45° C. as a sensed temperature, the controller shall output a command value to the temperature regulator 23 for performing the cooling operation, the B-side temperature control system will perform the cooling operation reverse to the normal operation. As a result, the following problem will arise.

In this case, upon receipt the command value the temperature regulator 23 performs the cooling operation to lower the temperature of the radiator 13, which lowers also the temperature of the B-side of the Peltier device 12.

Also the temperature of the A-side of the Peltier device 12 lowers resulting from the reduced temperature of the B-side. As a result, also the temperature of the control target 11 lowers, that is, the sensed temperature of the temperature sensor 14 which measures the temperature of the control target 11 lowers.

The controller 15 judges that the error (temperature difference $\Delta T$) between the sensed temperature and the control target value increases and excises control to increase a positive voltage value of the command voltage. In other words, if the error (temperature difference) between the sensed temperature and the control target value increases, the controller 15 exercises control to increase the temperature difference $\Delta T$ of the Peltier device AT for the purpose of eliminating the difference.

As described above, the temperature control system of FIG. 2 poses a problem in that the B-side temperature control system exercises the temperature control, which makes the operation inefficient rather than efficient according to circumferences, from the viewpoint of the A-side control system (hereinafter, referred to as the control inefficiency problem).

Further, if the controller 15 may not catch up with the elimination of the error, the temperature of the A-side of the Peltier device 12 lowers resulting from the temperature of the B-side. As a result, a problem arises in that the A-side temperature control system becomes uncontrollable (hereinafter referred to as the uncontrollable problem).

Examples of possible solutions to the control inefficiency problem and to the control uncontrollable problem could conceivably include a solution to associate the controller 15 with the controller 22, specifically, a solution to allow the controller 15 and the controller 22 to establish communication with each other, for example. Although not illustrated, the system adopting such a solution poses a problem in that it becomes more complicated than the temperature control system of FIG. 2.

Examples of a compromise solution to prevent the occurrence of such a new problem could conceivably include a solution in which attention is focused on only the solution to the uncontrollable problem and the Peltier device 12 is caused to allow for its capability. However, this solution may not solve the control inefficiency problem in the first place. Further, although the unsolved control inefficiency problem is allowed, there arises a new problem in that it is difficult to establish a system if a control target that evenly performs heating and cooling is adopted as the control target 11.

The present inventor has invented the following technique that solves the control inefficiency problem and the uncontrollable problem and concurrently establishes a system with ease. Specifically, the present inventor has invented a technique for operating the temperature regulator of the B-side temperature control system using a command voltage (drive voltage) to the Peltier device 12.

More specifically, if a drive voltage for the Peltier device 12 is a positive voltage value, the A-side of the Peltier device 12 will be demanded to perform the cooling operation. Thus, also the temperature regulator of the B-side temperature control system is allowed to perform the cooling operation (the operation for lowering the temperature of the B-side of the Peltier device 12). In contrast, if a drive voltage for the Peltier device 12 is a negative voltage value, the A-side of the Peltier device 12 is demanded to perform the heating operation. Thus, also the temperature regulator of the B-side temperature control system is allowed to perform the heating operation (the operation for raising the temperature of the B-side of the Peltier device 12). If it can be judged that the drive voltage for the Peltier device is zero, the Peltier device 12 itself does not operate. Thus, the operation of the temperature regulator of the B-side temperature control system is stopped. It is to be noted that such a technique is hereinafter simply referred to as the technique of the present invention.

Further, the demanded operation level of the Peltier device 12, namely, the demanded degree of cooling/heating is varied according to the magnitude of the absolute value (voltage value) of the command voltage to the Peltier device 12. Taking this into account, it is preferred that the degree of cooling/heating of the temperature regulator included in the B-side temperature control system be allowed to vary according to the magnitude of the absolute value (voltage value) of the command value to the Peltier device 12.

More specifically, for example, if a drive voltage for the Peltier device 12 is a large positive voltage value, the A-side of the Peltier device 12 will be demanded to perform strong cooling operation. Thus, it is preferred that the temperature regulator of the B-side temperature control system perform the cooling operation so as to strongly cool the B-side (directly, the radiator 13), namely, the strong-level cooling operation. On the other hand, for example, if a drive voltage for the Peltier device 12 is a small positive voltage value, the A-side of the Peltier device 12 will be demanded to perform weak cooling operation. Thus, it is preferred that also the temperature regulator of the B-side temperature control system perform the cooling operation so as to weakly cool the B-side (directly, the radiator 13), namely, the weak-level cooling operation.

Similarly, for example, if a drive voltage for the Peltier device 12 is a large negative voltage value, the A-side of the Peltier device 12 will be demanded to perform strong heating operation. Thus, it is preferred that the temperature regulator of the B-side temperature control system perform the heating operation so as to strongly heat the B-side (directly, the radiator 13), namely, the strong-level heating operation. On the other hand, for example, if a drive voltage for the Peltier device 12 is a small negative voltage value, the A-side of the Peltier device 12 will be demanded to perform weak heating operation. Thus, it is preferred that also the temperature regulator of the B-side temperature control system perform the heating operation so as to weakly heat the B-side (directly, the radiator 13), namely, the weak-level heating operation.

The configuration of an embodiment of the temperature control system to which such a technique of the present invention is shown in FIG. 3. In other words, FIG. 3 illustrates the configuration of the embodiment of the temperature control system to which the present invention is applied, which is different from that of FIG. 2.

As described above, if it is defined that a system refers to the entire apparatus composed of a plurality of processing devices and processing sections, the temperature control system of FIG. 3 can be grasped as one temperature control apparatus.

Portions corresponding to those in the temperature control system of FIG. 2 are denoted with like reference numerals in the temperature control system of FIG. 3. Such portions are already described in the explanation of the temperature control system of FIG. 2 or of the existing system of FIG. 1. Therefore, the explanations are appropriately omitted.

The temperature control system of FIG. 3 uses a Peltier device 12 to exercise temperature control on a control target 11. This control target 11 differs from that in the existing system of FIG. 1 and needs both cooling and heating applications. For example, the temperature control system can adopt a control target composed of the reflective liquid crystal panel or the like mentioned above.

The temperature control system of FIG. 3 includes the same A-side control temperature control system as that of FIG. 2. On the other hand, the temperature control system of FIG. 3 includes a B-side control temperature control system which differs from that of FIG. 2 and which includes only a temperature regulator 31 and a radiator 13. This temperature regulator 31 uses a command voltage from a controller 15 to perform cooling/heating operation on the radiator 13.

In other words, the temperature regulator 31 is an embodiment of the temperature regulator of the B-side temperature control system according to the technique of the present invention. The temperature regulator 31 can perform the cooling/heating operation according to the technique of the present invention described above.

The temperature regulator 31 suffices if it has a function of performing cooling/heating operation according to the technique of the present invention described above. Therefore, the embodiment of the function, namely, the configuration of the temperature regulator 31 is not particularly restrictive.

For example, if a command value given to the temperature regulator 23 of FIG. 2 is a voltage value, the temperature regulator 23 can be adopted as the temperature regulator 31 as it is. In addition, if the temperature regulator 23 is the cooling fan 16 of FIG. 1, the cooling fan 16 can be adopted as the temperature controller 31 as it is.

For example, if a command value given to the temperature regulator 23 of FIG. 2 is a different type of signal, the temperature regulator 23 may be employed which further supports a function of converting a command signal from the controller 15 to a command value of the different type of signal. If the temperature regulator 23 is the cooling fan 16 of FIG. 1, a system which includes the cooling fan 16 and a device converting a command voltage (a drive voltage for the Peltier device 12) from the controller 15 into an operation command for the cooling fan 16 may be employed as the temperature regulator 31.

Specific processing of the temperature regulator 31 described above is illustrated in the flowchart of FIG. 4 by way of example.

In step S1, the temperature regulator 31 obtains from the controller 15 a command voltage to the Peltier device 12, namely, a drive voltage for the Peltier device 12.

In step S2, the temperature regulator 31 judges whether or not the command voltage value is zero.

If the command voltage value is zero, a judgment is made as YES in the processing of step S2 and the processing proceeds to step S3, where the temperature regulator 31 stops the regulating operation. Then, the processing proceeds to step S11. The processing of step 11 and beyond is described later.

On the other hand, if the command voltage value is not zero, a judgment is made as NO in the processing of step 2 and the processing proceeds to step 4. The temperature regulator 31 judges whether or not the command voltage value is a positive value.

If the command voltage value is a positive value, a judgment is made as YES in the processing of step S4 and the processing proceeds to step 5. In step S5, the temperature regulator 31 judges whether or not the command voltage value (the absolute value) is equal to or greater than a threshold value.

If the positive command voltage value (the absolute value) is equal to or greater than a threshold value, a judgment is made as YES in the processing of step 5 and the processing proceeds to step 6. In step 6, the temperature regulator 31 starts strong-level cooling operation. Then, the processing proceeds to step S11. The processing of step 11 and beyond is described later.

On the other hand, if the positive command voltage value (the absolute value) is less than the threshold value, a judgment is made as NO and the processing proceeds to step S7, where the temperature regulator 31 starts weak-level cooling operation. Then, the processing proceeds to step S11. The processing of step S11 and beyond is described later.

If the command voltage value is a negative value, a judgment is made as NO and the processing proceeds to step 8, where the temperature regulator 31 judges whether or not the command voltage value (the absolute value) is equal to or greater than a threshold value.

If the negative command voltage value (the absolute value) is equal to or greater than the threshold value, a judgment is made as YES in the processing of step S8 and the processing proceeds to step S9, where the temperature regulator 31 starts strong-level heating operation. Then, the processing proceeds to step S11. The processing of step S11 and beyond is described later.

On the other hand, if the negative command voltage value (the absolute value) is less than the threshold value, a judgment is made as NO in the processing of step 8 and the processing proceeds to step 10. In step 10, the temperature regulator 31 starts weak-level heating operation. Then, the processing proceeds to step S11. The processing of step S11 and beyond is described later.

In this way, the processing of any one of steps S3, S6, S7, S9 and S10 is executed. In other words, any one of the heating operation, cooling operation and stoppage operation is started as the regulating operation of the temperature regulator 31. Thereafter, the processing proceeds to step S11.

In step S11, the temperature regulator 31 judges whether or not a predetermined time elapses.

If it is judged that the predetermined time does not elapse, a judgment is made as NO in step S11 and the processing proceeds to step S12, where the temperature regulator 31 judges whether or not the end of the processing is indicated.

In step S12, it is judged that the end of the processing is indicated, the processing of the temperature regulator 31 comes to an end.

On the other hand, if it is judged in step S12 that the end of the processing is not indicated yet, the processing is returned to step S11, where it is again judged whether or not the predetermined time elapses. That is to say, unless the end of the processing is indicated, the temperature regulator 31 repeats the loop process of steps S11 and S12 until a predetermined time elapses. Thus, the regulating operation (including the stoppage of the regulating operation) started in any one of the processing of steps S3, S6, S7, S9 and S10 is maintained.

After the elapse of the predetermined time, a judgment is made as YES in the processing of step S11 and the processing is returned to step S1. Then, the processing of step S1 and beyond is repeated. Specifically, every elapse of the predetermined time a command voltage (a drive voltage for the Peltier device 12 at the time) from the controller 15 is newly obtained. In addition, the regulating operation of the temperature regulator 31 is updated for each obtainment according to its voltage value (including the maintenance of the current operating state).

Incidentally, the predetermined time is not particularly restrictive and may be set at an optional time by a designer or the like. For example, time in seconds or in minutes may be set as the predetermined time. In addition, time in one clock period or the like can be set as the predetermined time.

The regulating operation of the temperature regulator 31 in the example of FIG. 4 employs the two steps, the strong-level and weak-level, for each of the cooling and the heating operation. However, such regulating operation is not restrictive and may employ optional levels, namely optional steps. This "optional steps" has a comprehensive concept containing steps in the case of discretely varying levels as well as steps in the case of continuously varying levels (the infinite steps). It is not necessarily demanded to make the number of the levels of the heating operation correspond to that of the cooling operation. The numbers of the levels of the heating and the cooling operation may be set independently of each other.

As described above, the temperature control system of FIG. 3 to which the technique of the present invention is applied is more simplified in the configuration of the B-side temperature control system than that of FIG. 2. Specifically, the controller 15 which gives the Peltier device 12 the drive voltage (the command voltage) can serve also as the controller for the B-side temperature regulator. As a result, the temperature sensor 21 is eliminated; therefore, the configuration of the entire system can be simplified.

In other words, the temperature control system of FIG. 3 can reduce the number of the temperature sensors as compared with that of FIG. 2. In addition, a portion relating to the attachment structure (particularly, for the B-side) of the Peltier device 12 can be simplified to enable low cost.

It is difficult for the existing system of FIG. 1 to realize the compatibility between the heating and cooling operation for the control target 11. The temperature control system of FIG. 2 can realize the compatibility but has a problem with the efficiency of the operation. On the other hand, the temperature control system of FIG. 3 can efficiently realize the compatibility between the heating and cooling operation for the control target 11 and thus enables to expand the controllable temperature range. Such an effect becomes more prominent when the control target 11 is a target that has intensive temperature changes and a severe request for a controllable temperature range, e.g., a reflective liquid crystal panel or the like. In other words, it is preferable that the temperature control system of FIG. 3 be constructed if a target that has intensive temperature changes and a severe request for a controllable temperature range, e.g., a reflective liquid crystal panel or the like, is employed as the control target 13.

Further, the temperature control system of FIG. 3 can perform more efficient cooling (cooling according to the load for driving the Peltier device). Therefore, power saving of the entire system can be achieved. In addition, if a cooling fan or the like is employed as the temperature regulator of the B-side temperature control system, the operative sound level of the cooling fan or the like can be reduced to achieve the silentness of the entire system.

Incidentally, a series of the processing described above, namely, the processing of FIG. 4 can be executed by hardware as well as by software.

Figure 5:
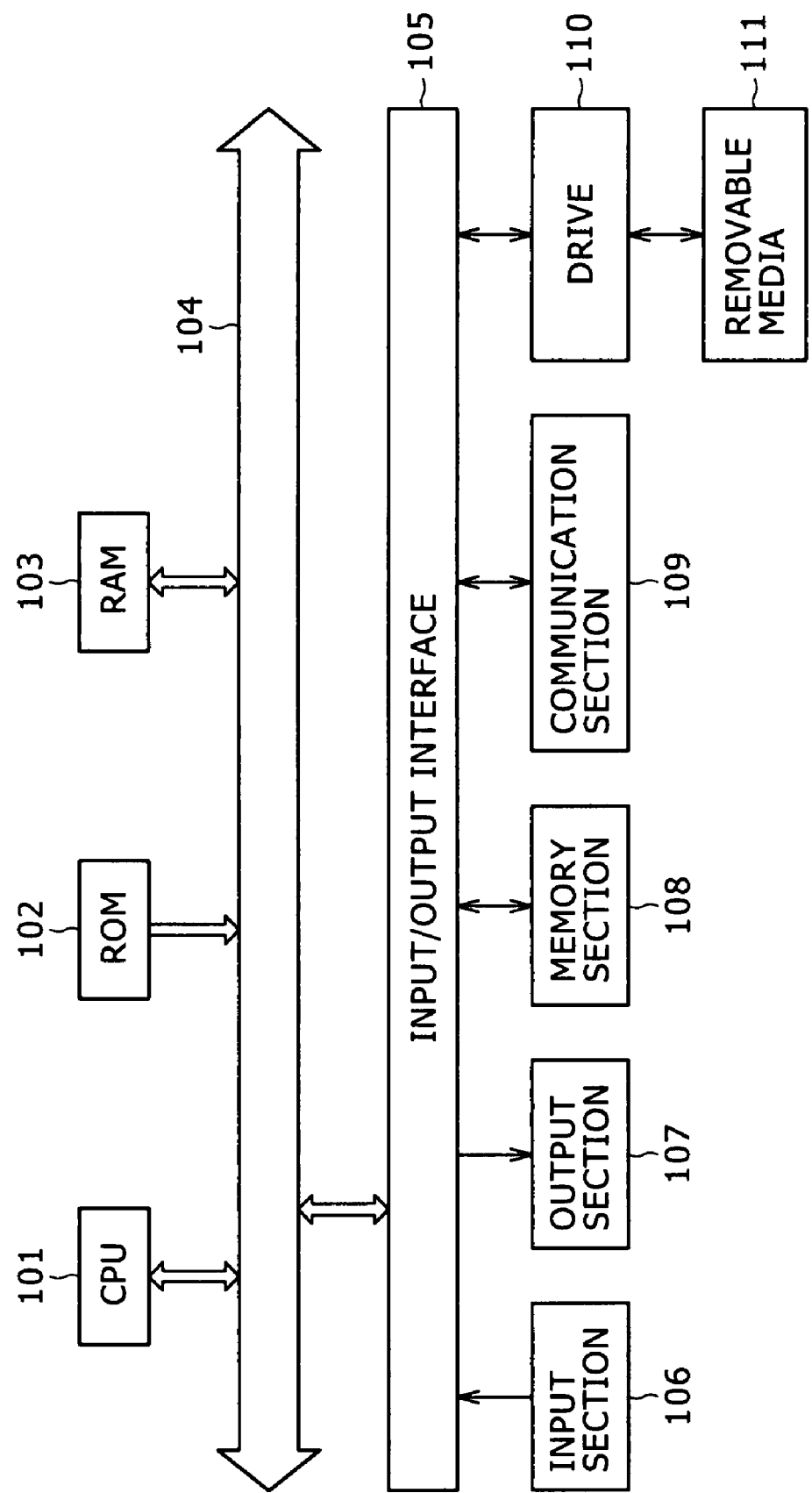
FIG. 5 is a block diagram illustrating the configuration of a computer used when processing embodying the present invention is executed through software by way of example.

In this case, for example, a computer shown in FIG. 5 can be employed as at least part of the controller 15 or the temperature regulator 31.

In FIG. 5, a CPU (Central Processing Unit) 101 performs various processing according to a program recorded in a ROM (Read Only Memory) 102 or a program loaded to a RAM (Random Access Memory) 103 from a memory section 108. The RAM 103 appropriately stores data requisite to allow the CPU 101 to perform the various processing.

The CPU 101, ROM 102 and RAM 103 are interconnected by a bus 104. An input/output interface 105 is connected to the bus 104.

An input section 106 composed of a keyboard, a mouse and the like, an output section 107 composed of a display and the like, a memory section 108 composed of a hard disk and the like, a communication section 109 composed of a modem, a terminal adapter and the like are connected to the input/output interface 105. The communication section 109 controls communication with other devices (not shown) via a network including the Internet.

A drive 110 is connected to the input/output interface 105 according to need. A removable medium 111 such as magnetic disk, an optical disk, a magnet-optical disk, or a semiconductor memory is attached to the drive 110. A computer program read from the removable media 111 is installed in the memory section 108 according to need.

To perform a series of processing by software, a program constituting the software is installed from a network or a recording medium into a computer assembled into a dedicated hardware or into e.g., a general-purpose personal computer which can perform various functions by various programs installed thereinto.

A recording medium including such a program is constituted of the program-recorded removable media (package media) 111 which are separate from a device main body and are distributed to users to provide the program therefor. Examples of the removable media include a magnetic disk (including a floppy disk), an optical disk (CD-ROM (Compact Disk-Read Only Memory), DVD (Digital Versatile Disk)), a magnet-optical disk (MD (Mini-disk)), and a semiconductor memory. Alternatively, the recording medium is constituted of the program-recorded ROM 102, a hard disk included in the memory section 108, or the like, which is provided for the user in such a manner as to be preliminarily assembled in the device main body.

Incidentally, in the present specification, steps describing the program recorded in the recording medium include processing performed in chronological order, namely, in the order of the steps, as well as processing performed in parallel or individually, not necessarily in chronological order.

It should be understood by those skilled in the art that various modifications, combinations, sub-combinations and alternations may occur depending on design requirements and other factors insofar as they are within the scope of the appended claims or the equivalents thereof.

What is claimed is:

1. A temperature control apparatus which controls temperature of a control target disposed on the side of an A-side of a Peltier device, the apparatus comprising:
    a temperature regulator which performs regulating operation on temperature of a B-side of the Peltier device opposite to the A-side on the basis of a drive voltage for the Peltier device; and
    a radiator disposed on the side of the B side of the Peltier device,
    in which the temperature regulator performs operation for regulating the temperature of the radiator as the regulating operation, and
    in which the temperature regulator includes a cooling fan and a heated air blower device, the heated air blower device being operable to apply heated air to the fan for supply to the radiator during the regulating operation when required.

2. The temperature control apparatus according to claim 1, wherein the temperature regulator:
   if the drive voltage is a positive voltage, performs temperature-lowering operation for lowering the temperature of the B-side of the Peltier device as the regulating operation;
   if the drive voltage is a negative voltage, performs temperature-raising operation for raising the temperature of the B-side of the Peltier device as the regulating operation; and
   when it is judged that the drive voltage is zero, stops the regulating operation.

3. The temperature control apparatus according to claim 2, wherein the temperature regulator further varies the degree of the temperature-lowering operation or the temperature-raising operation according to a voltage value of the drive voltage.

4. The temperature control apparatus according to claim 1, further comprising:
   a temperature sensor for sensing the temperature of the control target; and
   a controller which determines a positive or negative voltage value as the drive voltage on the basis of the sensed temperature of the temperature sensor and applies the positive or negative voltage value to the Peltier device;
   wherein the temperature regulator performs the regulating operation on the basis of the drive voltage applied to the Peltier device from the controller.

5. A temperature control method for a temperature control apparatus which controls temperature of a control target disposed on the side of the A-side of a Peltier device, said method comprising the step of:
   performing by use of a temperature regulator regulating operation for regulating temperature of a B-side of the Peltier device opposite to the A-side on the basis of a drive voltage for the Peltier device,
   in which the temperature control apparatus includes a radiator disposed on the side of the B-side of the Peltier device,
   in which the temperature regulator performs operation for regulating the temperature of the radiator as the regulating operation, and
   in which the temperature regulator includes a cooling fan and a heated. air blower device, the heated air blower device being operable to apply heated air to the fan for supply to the radiator during the regulating operation when required.

6. A computer-readable medium having stored thereon a program for controlling a temperature regulator which performs regulating operation for regulating temperature of a B-side of a Peltier device opposite to an A-side, the temperature regulator included in a temperature control apparatus which controls temperature of a control target disposed on the side of the A-side, the program comprising the step of:
   controlling regulating operation of the temperature regulator on the basis of a drive voltage for the Peltier device,
   in which the temperature control apparatus includes a radiator disposed on the side of the B-side of the Peltier device,
   in which the temperature regulator performs operation for regulating the temperature of the radiator as the regulating operation, and
   in which the temperature regulator includes a cooling fan and a heated air blower device, the heated. air blower device being operable to apply heated air to the fan for supply to the radiator during the regulating operation when required.

* * * * *